(12) United States Patent
Martin (10) Patent No.: US 9,522,500 B2
(45) Date of Patent: Dec. 20, 2016

(54) TUBULAR LINER HAVING AN INNER TUBULAR FILM FOR THE LINING OF PIPELINES AND METHOD FOR THE CONTINUOUS MANUFACTURE OF THE TUBULAR LINER

(71) Applicant: Brandenburger Patentverwertung GBR, Garmisch-Partenkirchen (DE)

(72) Inventor: Philipp Martin, Landau (DE)

(73) Assignee: Brandenburger Patentverwertung GbR, Landau (DE)

( * ) Notice: Subject to any disclaimer, the term of this patent is extended or adjusted under 35 U.S.C. 154(b) by 684 days.

(21) Appl. No.: 13/955,212

(22) Filed: Jul. 31, 2013

(65) Prior Publication Data

US 2014/0037877 A1 Feb. 6, 2014

(30) Foreign Application Priority Data

Jul. 31, 2012 (DE) ........................ 10 2012 015 047

(51) Int. Cl.
*F16L 55/16* (2006.01)
*B29C 65/00* (2006.01)
(Continued)

(52) U.S. Cl.
CPC ............... *B29C 66/49* (2013.01); *B29C 53/38* (2013.01); *B29C 53/382* (2013.01); *B29C 53/40* (2013.01);
(Continued)

(58) Field of Classification Search
CPC .. F16L 55/165; F16L 55/1654; F16L 55/1655; F16L 55/1656; F16L 1/02; F16L 1/04; F16L 1/042; F16L 1/10; F16L 1/12; Y10T 428/1362; Y10T 428/1366; Y10T 428/1393; Y10T 156/1036; Y10T 156/1038; B29C 53/38; B29C 53/382; B29C 53/40; B29C 53/48
(Continued)

(56) References Cited

U.S. PATENT DOCUMENTS

| 4,521,465 A | 6/1985 | Schroeer et al. |
| 5,334,429 A * | 8/1994 | Imoto ..................... B29C 63/34 138/128 |

(Continued)

FOREIGN PATENT DOCUMENTS

| EP | 0100029 A1 | 2/1984 |
| WO | 0073692 A1 | 12/2000 |
| WO | 2012065698 A2 | 5/2012 |

*Primary Examiner* — Walter B Aughenbaugh
(74) *Attorney, Agent, or Firm* — Laurence A. Greenberg; Werner H. Stemer; Ralph E. Locher (57) ABSTRACT

A tubular liner for pipelines includes an inner tubular film and a fiber material layer located on the film and impregnated with a reactive resin curable under UV light. The film contains a styrene-proof and thermally weldable carrier material having a laminated non-woven layer on its outer side facing the fiber material. The carrier material includes an overlapping region along the film. Edge sections of the carrier material are thermally welded together in the overlapping region. The non-woven layer on the outer side of the radially inner lower edge section in the overlapping region is thermally welded to the carrier material on the lower side of the radially outer upper edge section, and the radially outer upper edge section in the overlapping region has a structure on its outer side enabling a durable adhesion of reactive resin. A method for manufacturing the tubular liner is provided.

20 Claims, 3 Drawing Sheets

(51) Int. Cl.
  *B29C 53/38* (2006.01)
  *B29C 53/40* (2006.01)
  *F16L 55/165* (2006.01)
  *B29C 53/48* (2006.01)
  *B29C 65/08* (2006.01)
  *B29L 23/00* (2006.01)

(52) U.S. Cl.
  CPC ............. *B29C 53/48* (2013.01); *B29C 65/087* (2013.01); *B29C 66/1122* (2013.01); *B29C 66/4322* (2013.01); *B29C 66/723* (2013.01); *B29C 66/72941* (2013.01); *B29C 66/81812* (2013.01); *B29C 66/83413* (2013.01); *F16L 55/1654* (2013.01); *F16L 55/1656* (2013.01); *B29C 66/71* (2013.01); *B29C 66/73921* (2013.01); *B29L 2023/006* (2013.01); *Y10T 156/10* (2015.01); *Y10T 156/1036* (2015.01); *Y10T 156/1038* (2015.01); *Y10T 156/1041* (2015.01); *Y10T 428/1362* (2015.01)

(58) Field of Classification Search
  USPC .................................................. 156/217, 218
  See application file for complete search history.

(56) References Cited

U.S. PATENT DOCUMENTS

| | | |
|---|---|---|
| 6,679,966 B1 | 1/2004 | Brandenburger |
| 2011/0083765 A1* | 4/2011 | Stark ................... F16L 55/162 138/97 |

* cited by examiner

TUBULAR LINER HAVING AN INNER TUBULAR FILM FOR THE LINING OF PIPELINES AND METHOD FOR THE CONTINUOUS MANUFACTURE OF THE TUBULAR LINER

CROSS-REFERENCE TO RELATED APPLICATION

This application claims the priority, under 35 U.S.C. §119, of German Patent Application DE 10 2012 015 047.4, filed Jul. 31, 2012; the prior application is herewith incorporated by reference in its entirety.

BACKGROUND OF THE INVENTION

Field of the Invention

The invention relates to a tubular liner for the lining of pipelines, including an inner tubular film and a layer of fiber material located on the inner tubular film. The fiber material is impregnated with a reactive resin which is curable under UV light. The inner tubular film contains a styrene-proof and thermally weldable carrier material, which has a laminated non-woven layer on its outer side facing the fiber material. The carrier material includes an overlapping region which extends along the inner tubular film. Edge sections of the carrier material are thermally welded to one another in the overlapping region. The invention also relates to a method for the continuous manufacture of an endless inner tubular film for a tubular liner, which includes forming the endless inner tubular film from a web-like or web-shaped, thermally weldable carrier material which has a laminated non-woven layer on its outer side and mutually thermally welding edge sections of the web-like carrier material which are superposed on one another and in an overlapping region.

In the field of trenchless rehabilitation of defective pipelines such as, for example, defective sewer pipes or sewer ducts, use is increasingly being made of tubular liners, so-called "inliners," which are formed of a fiber material, in particular of glass fiber fabric, which is impregnated with a liquid reactive resin that is cured by using light from a radiation source after the tubular liner has been drawn into the pipeline and expanded by compressed air. Such a tubular liner and a method for manufacturing such a tubular liner are disclosed, for example, in International Publication No. WO 00/73692, corresponding to U.S. Pat. No. 6,679,966. The tubular liner described therein has an inner tubular film with a laminated non-woven layer onto which resin-impregnated fiber rovings are wound in an overlapping manner on a winding mandrel. Since the welding together of the film which is laminated with the non-woven layer is very difficult, that publication proposes to remove the non-woven layer in the region of the longitudinal edges for the purpose of producing the inner tubular film and to subsequently connect the longitudinal edges to one another in an overlapping manner. Despite disclosing a device for the helical winding of an outer tubular film with a laminated non-woven layer, the publication makes no reference to a device for the continuous production of the inner tubular film on which a laminated non-woven layer wrapped with resin-impregnated fiber rovings is located.

Furthermore, it is disclosed in European Patent Application EP 0 100 029 A1, corresponding to U.S. Pat. No. 4,521,465, that the inner tubular film used for a tubular liner is produced by applying a non-thermoplastic polyurethane-urea coating and a thermoplastic polyurethane-urea coating superposed thereon to a web-like textile material in the form of a polyester non-woven material and to stitch together the longitudinal edges of the film. The seam is subsequently sealed by a thermally weldable or optionally also adhesively bondable film strip. The publications make no detailed reference as to how the connecting of the two longitudinal edges of the coated textile material and the application of the film strip occurs.

Furthermore, the Applicant of the instant application is aware of a method and a device for the manufacture of a tubular liner having an endless inner tubular film with a non-woven layer laminated thereon, disclosed in International Publication No. WO 2012/065698, in which tubular liner the longitudinal edges on the inner side of the tubular film in the overlapping region are covered by a film tape which is adhesively bonded or welded thereto. Despite the film tape providing a substantially air-tight welding seam which effectively prevents the emission of styrene vapors from the layer of resin-impregnated fiber rovings which surround the inner tubular film, the welding-on of the film tape requires the introduction of two welding seams, as a result of which the production effort is increased and the production speed is correspondingly decreased. Moreover, as a result of the two welding seams which have to be introduced, the risk of leakages is increased, which increases the risk of an emission of styrene vapors through the welding seams and, due to the additional welding joint or adhesive joint, there is additionally an increased risk that the intensity of UV light which is irradiated from the inside from a radiation source for curing the reactive resin in the fiber rovings will be weakened, for example by air pockets or flaws in the welding seam, to the extent that the reactive resin no longer completely cures, in particular on the outer side of the tubular liner. Additionally, the risk exists that the structure of the non-woven layer on the outer side of the inner tubular film will likewise be modified due to the thermal energy introduced during the welding operation, so that a reliable adhesion of the non-woven material to the fiber material thus no longer is ensured.

SUMMARY OF THE INVENTION

It is accordingly an object of the invention to provide a tubular liner having an inner tubular film for the lining of pipelines and a method for the continuous manufacture of the tubular liner, which overcome the hereinafore-mentioned disadvantages of the heretofore-known liners and methods of this general type, in which the tubular liner has an inner tubular film and at least one layer of resin-impregnated fiber material thereon, the tubular liner in the overlapping region offers a high transparency for the passage of UV light and a high tightness against the emission of styrene vapors and is simultaneously provided with a non-woven layer on its entire outer side which enables all-round adhesion of reactive resin to the outer side of the tubular liner and in which the method permits such a tubular liner to be manufactured with high precision and at a high production speed.

With the foregoing and other objects in view there is provided, in accordance with the invention, a tubular liner for lining pipelines. The tubular liner comprises an inner tubular film containing a styrene-proof and thermally weldable carrier material, the carrier material has an outer side, an overlapping region extending along the inner tubular film and edge sections being thermally welded to one another in the overlapping region. The edge sections include a radially inner lower edge section having an outer side and a radially outer upper edge section having a lower side and an outer side. A layer of fiber material is located on the inner tubular film. The fiber material is impregnated with a reactive resin being curable under UV light. A laminated non-woven layer is disposed on the outer side of the carrier material facing the fiber material. The non-woven layer is disposed on the outer side of the radially inner lower edge section in the overlapping region and is thermally welded to the carrier material on the lower side of the radially outer upper edge section. The outer side of the radially outer upper edge section has a structure in the overlapping region enabling a durable adhesion of reactive resin.

With the objects of the invention in view, there is also provided a method for the continuous manufacture of an endless inner tubular film for a tubular liner. The method comprises providing an inner tubular film containing a styrene-proof and web-shaped, thermally weldable carrier material having an outer side, an overlapping region extending along the inner tubular film, a radially inner lower edge section and a radially outer upper edge section with an outer side, providing a layer of fiber material located on the inner tubular film and impregnated with a reactive resin being curable under UV light, and providing a laminated non-woven layer on the outer side of the web-shaped carrier material facing the fiber material. The edge sections are supposed on one another and the edge sections are thermally welded to one another in the overlapping region. A structure is introduced into the overlapping region during the thermal welding of the edge sections, or a structure of the non-woven layer on the outer side of the radially outer upper edge section is maintained to cause the reactive resin to be durably adhesive in the overlapping region.

According to the invention, a tubular liner for the lining of pipelines includes an inner tubular film on which at least one layer of fiber material, in particular fiber rovings, is located, the fiber rovings being impregnated with a reactive resin which is curable under UV light. The fiber rovings are wound onto the inner tubular film preferably by using a winding device, such as disclosed, for example, in the previously-mentioned International Publication Nos. WO 00/73692, corresponding to U.S. Pat. No. 6,679,966, or WO 2012/065698. The inner tubular film in this case is formed of a web-like carrier film which is formed of a styrene-proof and thermally weldable carrier material, onto the outer side of which facing the fiber rovings a layer of a non-woven material is laminated. The non-woven material is preferably a thermoplastic material, in particular a polyester non-woven material. Instead of a polyester non-woven material it is, however, also conceivable for a glass non-woven material or else a non-woven material from any other suitable stock to be used. The two edge sections of the web-like carrier material in an overlapping region, which extends over the entire length of the inner tubular film, are thermally welded to one another in such a way that the laminated non-woven layer is located on the outer side of the inner tubular film, whereas the preferably smooth side of the carrier film extends along the inner side of the inner tubular film. The carrier material is preferably a multi-layered film having a PE layer, a PA layer, and a further PE layer located on the PA layer, the layer of non-woven material being laminated onto the further PE layer. The thickness of the carrier material with the laminated non-woven layer may, for example, be 220 μm of which, for example, 40 μm is attributable to the non-woven layer and in each case about 60 μm to the two PE layers and the PA layer in between, which ensures the styrene-proofing of the carrier material.

The tubular liner according to the invention is distinguished in that the non-woven layer on the outer side of the radially inner lower edge section in the overlapping region is thermally welded to the carrier material on the lower side of the radially outer upper edge section, and in that the radially outer side of the overlapping region has a structure which enables a durable adhesion of reactive resin, in particular UP resin.

By way of example, the structure may be introduced during the welding operation into the non-woven material which has been heated or has just begun to melt, or it may alternatively be obtained in that the structure of the original non-woven material is not or only unsubstantially modified during the welding operation by using particular measures, such as for example cooling.

In accordance with another preferred feature of the invention, the structure on the outer side of the overlapping region substantially corresponds to the structure of the non-woven layer on the outer side of the carrier material, which offers the advantage that a homogenous adhesive connection exists between the carrier material and the layer of fiber material over the entire inner tubular film after curing of the reactive resin, the adhesive connection durably connecting the inner tubular film to the fiber material through the reactive resin. Due to this measure, the risk of the inner tubular film peeling or detaching when the tubular liner is flushed with a high-pressure jet is reliably eliminated.

In accordance with a further preferred feature of the invention, the structure which is introduced is preferably an embossed structure, which is introduced into the non-woven layer on the outer side of the carrier material by using a roller-like embossing tool, once the two longitudinal edges of the carrier material have been superposed. This offers the advantage that the structure can be replaced by another structure in the shortest time by a corresponding replacement of the roller-like embossing tool, for example in order to produce a tubular liner with another configuration or another type of inner tubular film or non-woven layer.

In accordance with an added preferred feature of the invention, the overlapping region has a width in the range from 5 mm to 15 mm, in particular 8 mm to 12 mm, and particularly preferably 11 mm. This has emerged from testing carried out by the Applicant as being the optimum compromise between a sufficiently durable styrene proofing of the welding connection and as far as possible a homogenous uniform transparency of the welding connection. The latter is of particular significance because more thermal energy has to be introduced into the overlapping region as the width of the overlapping region increases, in order to liquefy the plastics material. Due to this, however, the risk also increases that air pockets are created in the liquefied plastics material, the air pockets causing the UV light, which is irradiated for the purpose of curing the reactive resin, to scatter, thus leading to flaws in the finished tubular liner, in which flaws the reactive resin on the outer side of the tubular liner is not fully cured. However, if the width of the overlapping region is chosen to be too narrow, the risk exists that harmful styrene vapors escape from the reactive resin through the welding seam into the interior space of the tubular liner and from there into the environment. In addition, the styrene damages the welding seam, in such a way that the welding seam with too narrow a width is no longer air-tight and that the tubular liner can then no longer be inflated in the required manner after having been drawn into a duct to be rehabilitated, or that air penetrates into the fiber material during inflation and prevents the necessary compression. Besides, an explosive mixture, which may easily ignite when the UV lamps of the radiation source used for curing the reactive resin are switched on, may be created in the interior space of the tubular liner by styrene escaping through the welding seam.

In accordance with an additional concept of the invention, the thermal energy for welding the non-woven material to the thermally weldable carrier material is introduced in a controlled manner on such a scale that a layer of homogenized molten non-woven material, which connects the edges of the film web in the overlapping region, is located between the overlapping edge sections. To this end, a non-woven material which melts at a comparatively low temperature of, for example, about 130 to 145° C. or lower, is used in a preferred manner. This offers the advantage that the actual non-woven material begins to melt completely and is substantially liquefied in a homogenous manner, this leading to a good transparency of the created welding seam to visible light and also to the UV light used for curing the reactive resin.

In accordance with yet another feature of the invention, the carrier material may have on the side which faces away from the non-woven layer a further layer of a thermally fusible plastics material, in particular polyethylene, the further layer having a thickness which is 0.5 to 3 times, in particular 0.75 to 2 times, preferably 1.25 to 1.6 times the thickness of the non-woven layer. This offers the advantage that non-woven material, such as for example polyester non-woven material or else glass fiber non-woven material having a comparatively high melting point in relation to the PE material of, for example, about 130° C. or more, can be used, with the non-woven material not being completely liquefied during the welding operation. The reason for this is that the PE material, which melts at a lower temperature, is in this case completely liquefied during the welding operation and penetrates and impregnates the non-woven layer, with a high transparency and homogeneity of the welding seam likewise being achieved as a result after the material has cooled.

In order to further reduce the risk of possible air pockets, the overlapping region is impinged on both sides by a compressive force during and/or after the liquefaction of the plastics material, with the compressive force pressing together and thus compressing the non-woven layer with the liquefied plastics material accommodated therein. The compressive force is preferably generated by the roller-like ultrasonic generating unit, which will be described in more detail in the following, and the also roller-like rotating embossing tool which bears on the ultrasonic generating unit, with the two overlapping edge sections of the web-like carrier material being guided between the ultrasonic generating unit and the embossing tool.

According to a further concept underlying the invention, in the method according to the invention for the continuous manufacture of an endless inner tubular film for a tubular liner, as described at the outset, a web-like thermally weldable carrier material, which on its outer side has a laminated layer of non-woven material, is superposed on itself in the region of the edge sections of the web-like carrier material and thermally welded together in the overlapping region created wherein, during the thermal welding, a structure is introduced into the radially outer non-woven layer over the overlapping region, or the structure of the non-woven layer on the outer side of the radially outer upper edge section is maintained in such a manner that the reactive resin durably adheres to the outer side of the overlapping region after the curing of the reactive resin. The structure introduced is chosen in this case in such a way that, after the curing of the reactive resin, the detaching forces/peeling forces on the carrier material in the overlapping region are of substantially the same scale as the detaching forces in the remaining region of the non-woven layer on the outer side of the carrier material, or of the finished inner tubular film.

In accordance with another preferred mode of the invention, the structure is introduced in an advantageous manner during the welding operation, as a result of which, in conjunction with an embossing tool used, the advantage is obtained that only low pressing forces are required, since the non-woven material on the outer side is already pre-heated by the thermal energy introduced.

In accordance with a further alternative mode of the invention, the structure is created by actively cooling the non-woven layer on the outer side of the overlapping region, this being achieved, for example, by a rotating roller-like embossing tool which is correspondingly impinged by cooling air, the embossing tool bearing on the likewise rotating ultrasonic generating unit or else on a heated rotating roller element on the side of the carrier material which faces away from the non-woven material. The surface of the rotating roller-like ultrasonic generating unit or of the heated roller element may be provided in this case with a structure which corresponds inversely to the structure of the embossing tool, in such a way that the roller element serves as a die for the embossing operation.

In accordance with an added preferred mode of the invention, the thermal welding energy for connecting the contact surfaces of the film edges in the overlapping region, preferably controlled by an electronic control unit, is introduced in a targeted manner into the overlapping region from the side of the carrier material which faces away from the non-woven material on such a scale that only the non-woven layer in the region of the contact surface of the overlapping region is substantially completely liquefied and homogenized, whereas the non-woven layer on the outer side of the overlapping region remains substantially unchanged. The electronic control unit in this case controls both the speed at which the web-like carrier material is advanced through the welding unit and also the intensity of the introduced ultrasonic energy or the thermal energy, and if applicable also the volume and/or the temperature of the cooling air.

In accordance with an additional mode of the invention, in order to ensure in this case that the film edges are superposed over one another in the required position, it has proven advantageous for the edges prior to superpositioning to be forced against a corresponding squaring fence by brushes which rotate at an angle to the direction of movement of the film edges.

In accordance with a concomitant mode of the invention, the non-woven layer in the region of the one edge section has a lower melting point than the non-woven layer in the region of the other edge section of the web-like carrier material, in such a way that, after the superpositioning of the two edge sections, the non-woven layer with the lower melting point lies against the lower side of the carrier material of the outer upper edge section, which is located on the outer side of the inner tubular film. This results in the advantage that the non-woven layer between the edge sections in the overlapping region can be completely liquefied with a lower expenditure of thermal energy, whereas the non-woven layer with the higher melting point on the outer side of the inner tubular film maintains the original form of its structure during the welding operation, if applicable even without additional cooling or other measures.

Other features which are considered as characteristic for the invention are set forth in the appended claims.

Although the invention is illustrated and described herein as embodied in a tubular liner having an inner tubular film for the lining of pipelines and a method for the continuous manufacture of the tubular liner, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
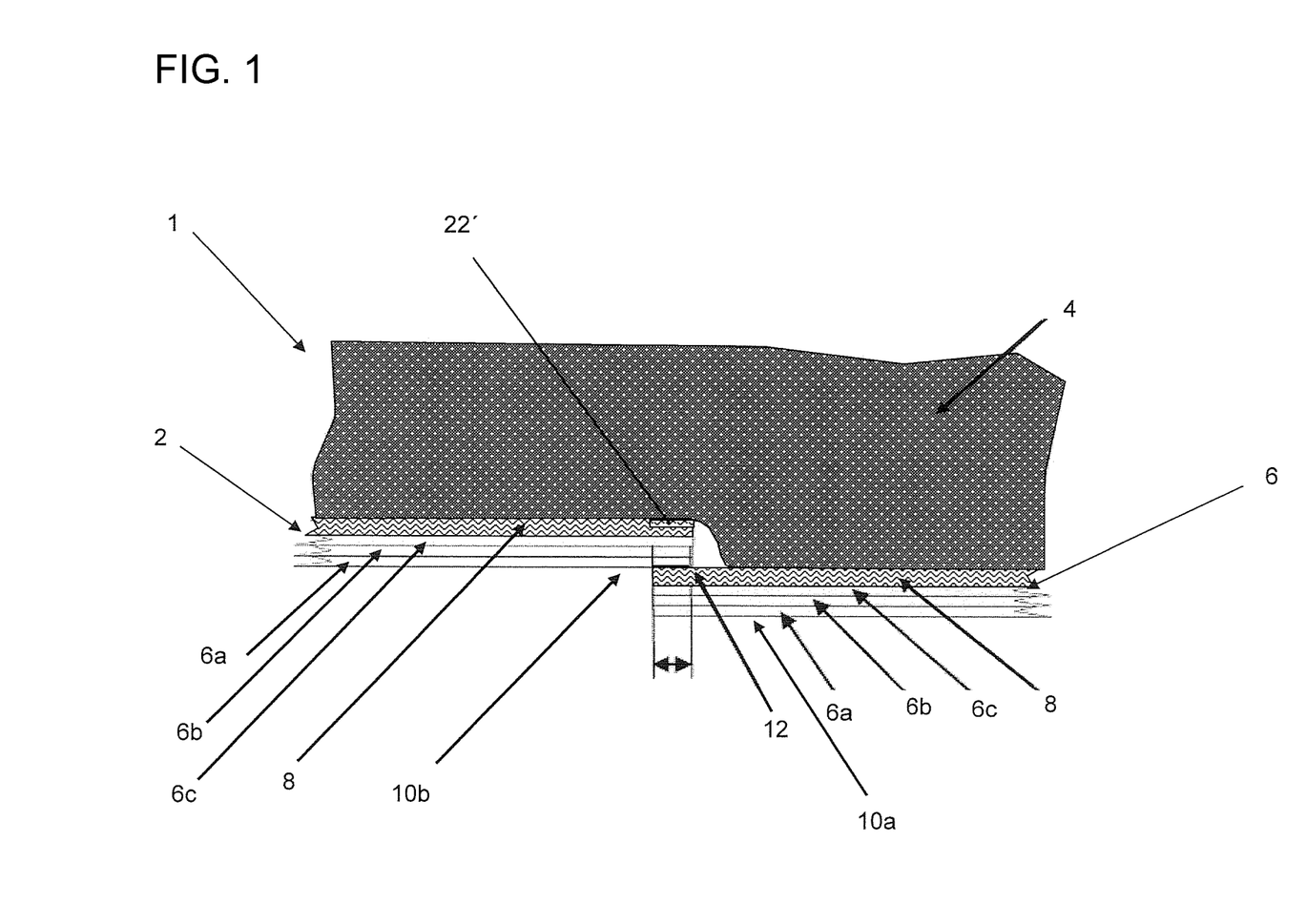
FIG. 1 is a fragmentary, diagrammatic, cross-sectional view of a tubular liner in an overlapping region.

Referring now to the figures of the drawings in detail and first, particularly, to FIG. 1 thereof, there is seen a tubular liner 1 including an inner tubular film 2 and at least one layer of a fiber material 4, in particular of fiber rovings, which is located on the inner tubular film 2 and is impregnated with reactive resin curable by UV light. The fiber rovings are preferably wound onto the inner tubular film by using a winding device, such as disclosed, for example, in the aforementioned International Publication Nos. WO 00/73692, corresponding to U.S. Pat. No. 6,679,966, or WO 2012/065698.

Figure 2:
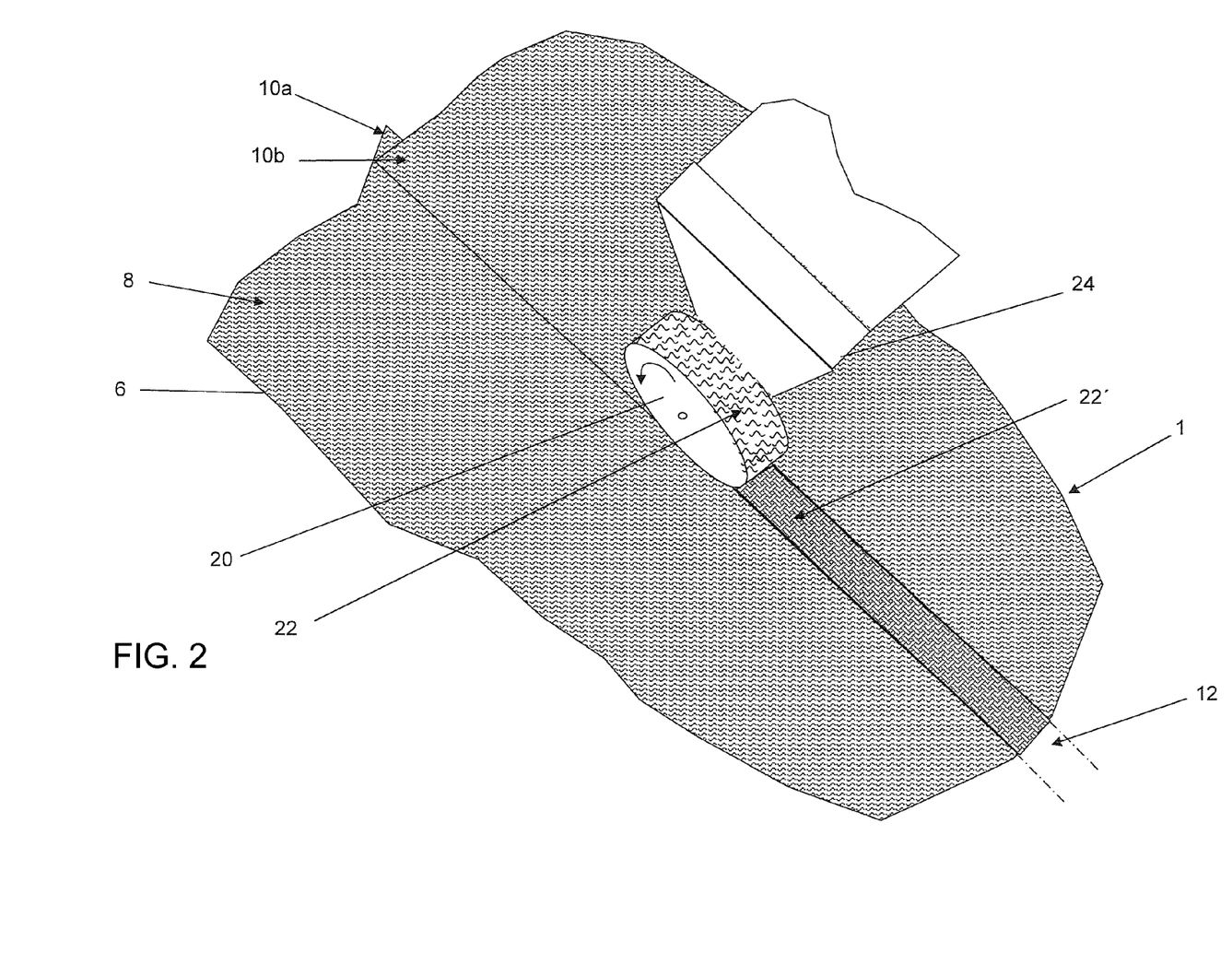
FIG. 2 is a fragmentary, perspective, plan view of a roller-like embossing tool of a welding unit during welding of overlapping edge sections of an inner tubular film.
Figure 3:
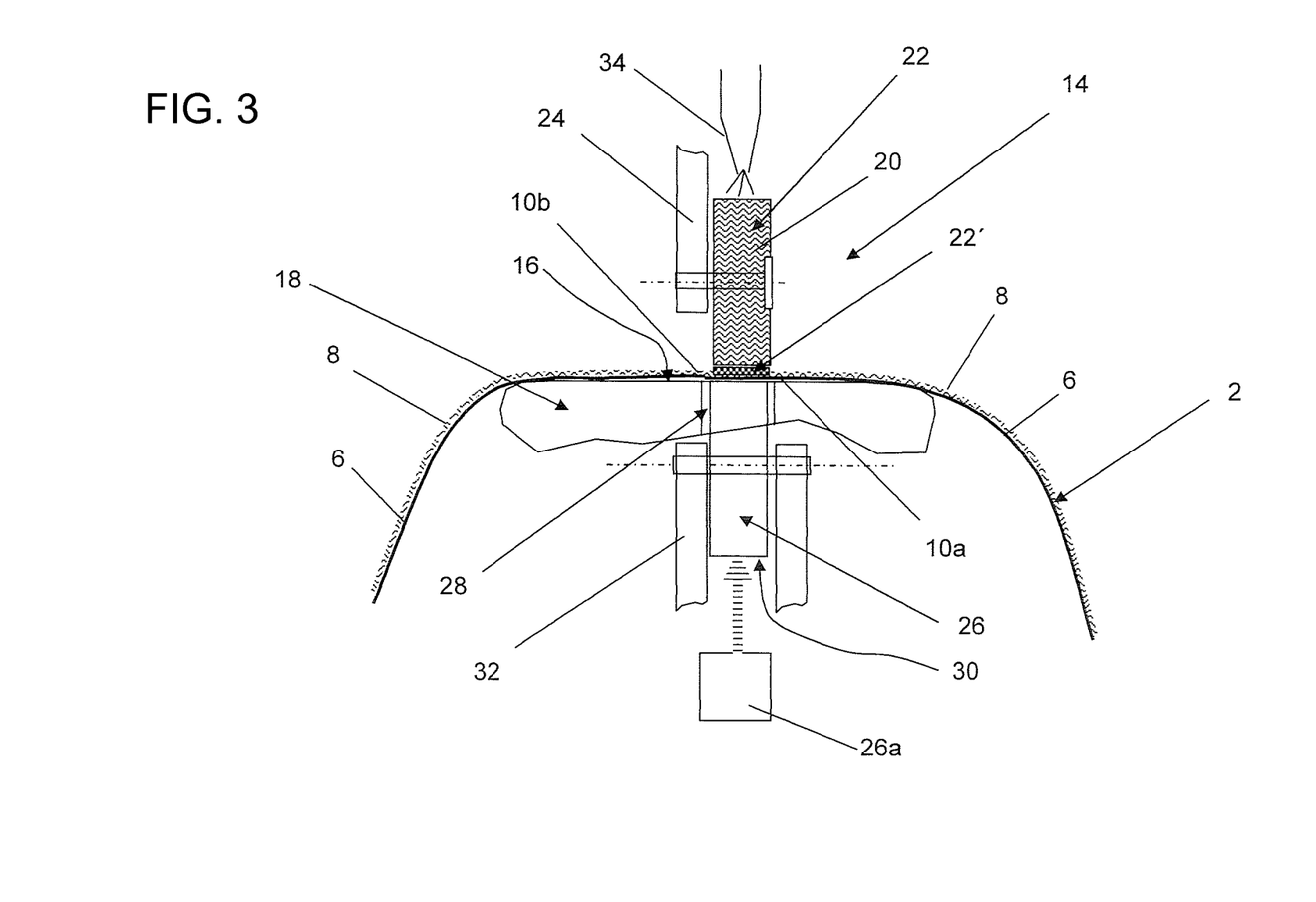
FIG. 3 is a fragmentary, cross-sectional view of a welding unit with indicated carrier material during a welding operation.

As is indicated in the illustrations of FIGS. 2 and 3, the inner tubular film 2 is produced from a web-like carrier film 6, which includes a styrene-proof carrier material which, according to the illustration of FIG. 1, includes a radially inner first polyethylene layer (PE layer) 6a, a polyamide layer (PA layer) 6b applied thereon, and a second or further polyethylene layer (PE layer) 6c applied on the PA layer. A non-woven layer 8 is laminated onto the further polyethylene layer. The non-woven material, i.e. the material of the non-woven layer 8, is preferably a thermoplastic material, in particular a polyester non-woven material, having a thickness of preferably 30 to 40 micrometers and an area weight of 40 g/m2.

As can be further gathered from the illustration of FIGS. 1 and 2, first and second edge sections 10a and 10b of the web-like carrier material 6 are superposed in an overlapping region 12, which extends over the entire length of the inner tubular film 2 and has a width of preferably 8-12 mm. The overlapping region 12 is configured in such a way that the non-woven layer 8 on the outer side of the lower, radially inner first edge section 10a is located over the radially inner PE layer 6a of the upper, radially outer second edge section 10b.

In order to superpose the two edge sections 10a and 10b of the web-like carrier film 6, the carrier film 6 is, for example, unrolled from a roll and guided through non-illustrated first and second forming shoulders toward non-illustrated squaring fences as disclosed, for example, in International Publication No. WO 2012/065698.

Following the superpositioning of the first and second edge sections 10a, 10b, they are fed to a thermal welding unit 14, which is diagrammatically shown in FIGS. 2 and 3. According to the illustration of FIG. 3, the thermal welding unit 14 includes a preferably horizontally extending guiding surface 16 which may, for example, be part of a winding mandrel 18 of a winding device such as that described, for example, in the aforementioned International Publication No. WO 2012/065698. A roller-like embossing tool 20 is located above the guiding surface 16. The embossing tool 20 has an outer side with a structure 22 which has alternating raised or proud and recessed regions. The roller-like embossing tool 20, which is preferably configured as an exchangeable anvil wheel, may, by way of example, be rotatably mounted on a supporting arm 24 which is supported on a non-illustrated housing part, which is fixed to the frame of the winding device or another component fixed to the frame.

A rotating roller-like ultrasonic generating unit 26, which is located opposite the roller-like embossing tool 20 on the lower side of the guiding surface 16, has a circumferential surface 30 that extends through a slot-like opening 28 in the guiding surface 16 up to a level of the guiding surface 16. The rotating roller-like ultrasonic generating unit 26 is preferably accommodated freely rotatably on a further holding arm 32, which is preferably supported on the winding mandrel 18 in the interior of the same. As can be furthermore gathered from the illustration of FIG. 3, the roller-like ultrasonic generating unit is connected to a diagrammatically indicated ultrasonic generator 26a. The ultrasonic generator 26a generates and couples ultrasonic energy into the roller-like ultrasonic generating unit 26, as is indicated by a dashed arrow. The ultrasonic energy is introduced from the ultrasonic generating unit into the overlapping region 12 from below. The non-woven material 8 of the lower edge section 10a, which in the overlapping region 12 is located between the PE layer 6a and the PE layer 6c, is put into high-frequency oscillation by the introduced ultrasonic energy and heated by friction-induced heat to the extent that the thermoplastic polymer material of the PE layer 6c melts, liquefies and penetrates into the non-woven material 8.

The pressing force between the circumferential surface 30 of the ultrasonic generating unit 26 and the circumferential surface, which is provided with the structure 22, of the roller-like embossing tool 20 in this case can be modified, preferably by using non-illustrated resilient devices. This may also occur, in an advantageous manner, through a non-illustrated electrically operated actuator. Due to the interaction of the embossing tool 20 with the rotating roller-like ultrasonic sound generating unit 26, which preferably has a smooth even surface to enable an improved coupling of the ultrasonic energy into the overlapping region, a structure 22' corresponding to the structure 22 is created on the outer side of the upper longitudinal section 10b. The structure 22' is preferably similar to the structure of the original non-woven layer 8, as is indicated in FIGS. 2 and 3.

In order to alternatively provide the possibility for the original structure 22' of the non-woven layer on the outer side of the upper edge section 10b to be maintained despite the introduced thermal energy, a cooling unit 34, for example a blower jet indicated in FIG. 3, may furthermore be provided and additionally or alternatively assigned to the roller-like embossing tool 20. The cooling unit 34 additionally impinges on the outer side of the overlapping region 12 with cooled air in order to prevent melting of the non-woven layer 8 on the outer side of the overlapping region 12. This ensures that only the polyethylene layer 6*a* of the upper edge section 10*b* is liquefied by the introduced ultrasonic energy, whereas the non-woven layer 8 on the outer side of the inner tubular film 2 in the overlapping region 12 is actively cooled by the cooler rotating embossing tool 20 or the cooling unit, thus preventing melting of the non-woven material 8 and the underlying polyethylene layer 6*c*. Due to the complete liquefaction of the polyethylene layer 6*a* of the upper edge section 10*b* in the overlapping region 12, the non-woven material 8 in this region is completely impregnated, in such a way that an extremely strong and air-tight thermal welding connection, which is substantially homogenous and transparent to UV light used for the curing of the reactive resin and also to visible light, is obtained after the cooling of the liquefied plastics material.

It goes without saying that, instead of an ultrasonic generating unit 26, a heated roller-like element, which can be made to bear with a predetermined pressing force on the rotating roller-like embossing tool 20 in the same manner, may be used in order to continuously produce the styrene-proof welding seam in the overlapping region 12 while at the same time maintaining a structure 22' or producing a structure 22' on the outer side of the non-woven layer 8.

In the manner described above it is possible to produce an endless inner tubular film 2, around which the resin-impregnated fiber material 4 is wound in a downstream winding device, or around which a layer of fiber material 4 can be created by laying and optionally stitching edges of felt or glass fiber mats, which can be optionally impregnated in a subsequent method step.

Despite the introduction of ultrasonic energy preferably occurring from the inner side of the inner tubular film 2 in the embodiment shown in FIGS. 2 and 3, it is also possible to position the ultrasonic generating unit 26 on the outer side of the inner tubular film 2, i.e. on the side of the non-woven layer 8, and to position the roller-like embossing tool/anvil wheel 20 on the inner side of the inner tubular film, preferably within the winding mandrel 18, shown in FIG. 3, below the guiding surface 16.

The invention claimed is:

1. A tubular liner for lining pipelines, the tubular liner comprising:
    an inner tubular film containing a styrene vapor emission-proof and thermally weldable carrier material;
    said carrier material having an outer side, an overlapping region extending along said inner tubular film and edge sections being thermally welded to one another in said overlapping region;
    said edge sections including a radially inner lower edge section having an outer side and a radially outer upper edge section having a lower side and an outer side;
    a layer of fiber material being impregnated with a reactive resin being curable under UV light;
    a laminated non-woven layer disposed on and laminated to said outer side of said carrier material facing said fiber material;
    said non-woven layer disposed on said outer side of said radially inner lower edge section in said overlapping region and thermally welded to said carrier material on said lower side of said radially outer upper edge section; and
    said outer side of said radially outer upper edge section having a structure in said overlapping region increasing a durability of adhesion of the reactive resin.

2. The tubular liner according to claim 1, wherein said structure substantially corresponds to a structure of said non-woven layer on said outer side of said carrier material.

3. The tubular liner according to claim 1, wherein said structure is an embossed structure.

4. The tubular liner according to claim 1, wherein said overlapping region has a width in a range of from 5 mm to 15 mm.

5. The tubular liner according to claim 1, wherein said overlapping region has a width in a range of from 8 mm to 12 mm.

6. The tubular liner according to claim 1, wherein said overlapping region has a width in a range of approximately 11 mm.

7. The tubular liner according to claim 1, wherein said carrier material is web-shaped, and said non-woven layer is a layer of homogenized previously-molten non-woven material located between said overlapping edge sections of said web-shaped carrier material and connecting said edge sections to one another in said overlapping region.

8. The tubular liner according to claim 7, wherein:
    said carrier material has a side facing away from said non-woven layer and a further layer of a thermally fusible plastics material disposed on said side facing away from said non-woven layer, said further layer having a greater thickness than said non-woven layer; and
    a substantially homogenous further layer of non-woven material and further plastics material is accommodated in said non-woven material and located in said overlapping region, said substantially homogenous layer effecting said connection between said edge sections.

9. The tubular liner according to claim 8, wherein said thermally fusible plastics material is polyethylene.

10. A method for the continuous manufacture of an endless inner tubular film for a tubular liner, the method comprising the following steps:
    providing an inner tubular film containing a styrene vapor emission-proof and web-shaped, thermally weldable carrier material having an outer side, an overlapping region extending along the inner tubular film, a radially inner lower edge section and a radially outer upper edge section with an outer side;
    providing a layer of fiber material impregnated with a reactive resin being curable under UV light;
    providing a laminated non-woven layer disposed on and laminated to the outer side of the web-shaped carrier material facing the fiber material;
    superposing the edge sections on one another and thermally welding the edge sections to one another in the overlapping region; and
    introducing a structure into the overlapping region during the thermal welding of the edge sections to increase a durability of adhesion of the reactive resin in the overlapping region.

11. The method according to claim 10, which further comprises carrying out the step of introducing the structure during the welding step.

12. The method according to claim 11, which further comprises carrying out the step of maintaining the structure during the welding step by cooling the radially outwardly located non-woven layer after the step of superpositioning the edge sections.

13. The method according to claim 10, which further comprises introducing the structure into the outer side of the radially outer edge section at the overlapping region by an embossing operation.

14. The method according to claim 13, which further comprises carrying out the introduction of the structure using a rotating, roller-shaped embossing tool.

15. The method according to claim 14, which further comprises cooling the embossing tool.

16. The method according to claim 14, which further comprises providing a rotating ultrasonic generator for the rotating, roller-shaped embossing tool, and coupling ultrasonic energy into the overlapping region using the ultrasonic generator.

17. The method according to claim 16, which further comprises carrying out the step of coupling ultrasonic energy using the ultrasonic generator, from a side of the carrier material facing away from the non-woven layer.

18. The method according to claim 10, which further comprises:
   providing the edge sections with plastics material; and
   introducing thermal welding energy for connecting the edge sections in the overlapping region on such a scale that the non-woven layer and/or the plastics material of the radially outer upper edge section and/or the plastics material of the radially inner lower edge section in the overlapping region is substantially completely liquefied and homogenized, and the non-woven layer on the outer side of the radially outer edge section in the overlapping region remains substantially unchanged.

19. The method according to claim 10, which further comprises forcing the edge sections, prior to the superpositioning step, against a squaring fence using brushes rotating at an angle relative to a direction of movement of the edge sections.

20. The method according to claim 10, which further comprises providing the non-woven layer in vicinity of one edge section with a lower melting point than the non-woven layer in vicinity of the other edge section, causing the non-woven layer with the lower melting point to lie against a lower side of the carrier material of the radially outer upper edge section, after the superpositioning of the edge sections.

* * * * *

UNITED STATES PATENT AND TRADEMARK OFFICE
CERTIFICATE OF CORRECTION

PATENT NO. : 9,522,500 B2  
APPLICATION NO. : 13/955212  
DATED : December 20, 2016  
INVENTOR(S) : Philipp Martin Page 1 of 1

It is certified that error appears in the above-identified patent and that said Letters Patent is hereby corrected as shown below:

On the Title Page

Item (71) should read:

(71) Applicant: Brandenburger Patentverwertung GbR, Landau (DE)

Signed and Sealed this  
Twenty-eighth Day of February, 2017

Michelle K. Lee  
*Director of the United States Patent and Trademark Office*